2,865,887

GLYCIDYL ETHERS OF REACTION PRODUCTS OF CERTAIN PHENOLS WITH POLYMERIZABLE AROMATIC SUBSTANCES CONTAINING AT LEAST ONE VINYL GROUP

James Brown Douglas Mackenzie, Duxford-Cambridge, England, assignor to Ciba Limited, Basel, Switzerland No Drawing. Application April 30, 1954
Serial No. 426,933

Claims priority, application Great Britain May 1, 1953

11 Claims. (Cl. 260—47)

The present invention relates to novel glycidyl ethers of reaction products of certain phenols with polymerizable aromatic substances containing at least one vinyl group attached to a carbon atom of a benzene nucleus and to a method for producing them.

The novel glycidyl ethers of this invention are the glycidyl ethers of a particular class of organic reaction products, namely those produced by reacting (A) a phenol containing at least one free phenolic hydroxyl group and at least one unsubstituted reactive position in a benzene nucleus and being free from other substituents capable of reacting with epoxide groups with (B) a polymerizable aromatic substance containing at least one vinyl group attached to a carbon atom of a benzene nucleus.

Suitable phenols of the type (A) are monohydric phenols, such as phenol or cresol, polyhydric phenols such as resorcinol or polynuclear phenols such as 4:4'-dihydroxydiphenylpropane. Mixtures of phenols may also be employed. The only limitations on the type of phenol employed are that it should contain at least one free phenolic hydroxyl group and at least one unsubstituted reactive position in a benzene nucleus and that it should be free from other substituents capable of reacting with epoxide groups. Phenol ethers such as anisole are therefore not included in the invention, nor is such a phenol as 2:4:6-trimethylphenol.

Suitable substances of type (B) are aromatic substances, which contain at least one vinyl group attached to a carbon atom of a benzene nucleus, and preferably those being free from substituents capable of reacting with epoxide groups, for instance styrene, α-methyl styrene, parachlorostyrene, vinyltoluene or divinylbenzene. Amongst these substances the hydrocarbons are preferred, especially styrene and divinylbenzene. Mixtures of such substances may also be employed.

The component (A) is first reacted with the component (B) in the presence of a catalyst such as sulfuric acid, hydrochloric acid, toluene sulfonic acid, or a Friedel-Crafts catalyst and the product therefrom is then reacted with a chlorhydrin selected from the group consisting of epichlorohydrin and glycerol dichlorhydrin in the presence of an alkaline reagent such as sodium hydroxide to produce a glycidyl ether.

The glycidyl ethers thus produced cannot all be converted into infusible products by reaction with the conventional hardeners. Whether or not the glycidyl ether can be converted into an infusible product depends upon the type of the substances (A) and (B) employed in its manufacture. For example, if phenol itself is reacted with styrene itself in the presence of a catalyst, and the product further reacted with epichlorohydrin a glycidyl ether is obtained which cannot be converted into an infusible product in the normal way. However, if phenol is reacted with divinylbenzene an intermediate product is obtained which can be considered to consist essentially of the bisphenol

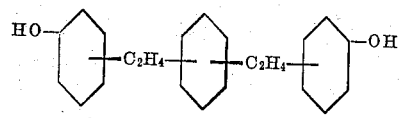

and upon reaction with the epichlorohydrin yields a hardenable (thermosetting) glycidyl ether. On the other hand reaction of a dihydric phenol such as resorcinol with either a substance containing one vinyl group or substance containing several vinyl groups will in both cases finally yield a thermosetting glycidyl ether. For the purpose of the present invention, thermosetting glycidyl ethers are particularly preferred, these being obtained by the interaction of a monohydric phenol from class (A) with a substance containing at least two vinyl groups from class (B), or alternatively by the interaction of a polyhydric phenol from class (A) with any of components (B). If a mixture containing a monohydric and a polyhydric phenol of type (A) is employed, then it is important that at least part of the component of type (B) should contain at least two vinyl groups if a thermosetting glycidyl ether is to be obtained.

When conventional epoxy resins (glycidyl ethers), e. g. those obtained by the interaction of dihydroxydiphenylpropane and epichlorohydrin, are reacted with conventional hardeners, e. g. organic acid anhydrides or aliphatic polyamines, the final products have the disadvantage that, although substantially infusible, they lose much of their mechanical strength and rigidity in the neighbourhood of 100° C. This loss in strength corresponds to the transition of the cured resin, as the temperature rises, from a hard vitreous solid to a softer rubber-like material, and the temperature at which it occurs is commonly known as the heat distortion temperature. For this reason conventional epoxy resins are unsuitable for use as structural materials or adhesives when considerable mechanical strength is required at temperatures in excess of about 100° C.

It has now been found that by means of the present process it is possible to prepare glycidyl ethers (epoxy resins) which, when hardened by the conventional hardeners, yield infusible products whose heat distortion temperatures are greatly in excess of 100° C., e. g. as high as 170° C., thus making them suitable for use at temperatures where conventional epoxy resins have lost most of their strength.

A further advantage of the hardened products obtained by the present process is that, besides possessing excellent mechanical properties and good adhesion to a variety of materials, they exhibit water resistance superior to that possessed by the corresponding materials prepared without prior reaction with components of type (B).

The invention is further illustrated by the following examples, the parts being by weight.

Example 1

A mixture of 114 parts of 4:4'-dyhydroxydiphenylpropane, 104 parts of styrene and 3 parts of 70% sulfuric acid was heated with stirring to 80° C., when a moderate exotherm occured. After 1 hour at 80–90° C. 2.5 parts of sodium carbonate were added, and after effervescence had ceased, the product was cooled to room temperature at which it appeared as a very viscous resinous mass. This product was then converted directly into a glycidyl ether by reaction with an excess of epichlorohydrin in the presence of sodium hydroxide. The product was a low melting resinous solid having an epoxy content of 3.05 equivalents per kg.

When a mixture of 100 parts of this resin and 40 parts of phthalic anhydride was cured for 2 hours at 120° C. and then for 16 hours at 140° C. a hard infusible product was obtained. When a cylindrical casting of the hardened material, measuring 2" in length and 1" diameter, was boiled in water for 1 hour it increased in weight by 0.08%. The heat-distortion temperature of the cured product was 103° C.

When a similar specimen of hardened resin, but prepared directly from 4:4'-dihydroxydiphenylpropane without prior reaction with styrene, the unhardened resin having an epoxy content of 2.4 equivalents per kg., was boiled in water for 1 hour, the increase in weight was 0.13%, over 50% greater.

Example 2

128 parts of bisphenol prepared by reaction of ortho-cresol with acetone was heated at 90–95° C. for 4 hours with 104 parts of styrene, 3 parts of 70% sulfuric acid and 4 parts of concentrated hydrochloric acid. The excess acid was then neutralized with sodium carbonate and the product converted into an epoxy resin by reaction with excess epichlorhydrin in the presence of sodium hydroxide. The resulting resin had a softening point below room temperature and an epoxy content of 2.53 equivalents per kg.

When hardened with phthalic anhydride or triethylene tetramine it gave hard, infusible products with excellent water resistance.

Example 3

A mixture of 110 parts of resorcinol and 132 parts of a mixture containing 55% divinylbenzene (the remainder being ethylvinylbenzene together with smaller amounts of diethylbenzene) was heated with 2 parts of 8% hydrochloric acid for 2½ hours at 90° C. The product was then converted into a glycidyl ether by reaction with an excess of epichlorohydrin in the presence of sodium hydroxide, giving an epoxy resin with a softening point of 58° C. and an epoxy content of 4.7 equivalents per kg. When a homogeneous solution of 57 parts of phthalic anhydride in 100 parts of this resin cured for 3 hours at 180° C., a hard infusible product was obtained which had a heat distortion point of 180° C.

When resorcinol which had not been treated with divinylbenzene was converted into a glycidyl ether in analogous fashion, a liquid product was obtained, having an epoxy content of 7.5 equivalents per kg. 100 parts of this product cured under similar conditions with 80 parts of phthalic anhydride gave a hard casting with a heat distortion point of only 115° C.

Example 4

When Example 3 was repeated, except that only 88 parts of the divinylbenzene mixture was employed, a very viscous product with an epoxy content of 5.3 equivalents per kg. was obtained. A mixture of 100 parts of this resin and 67 parts of phthalic anhydride, heated for 1 hour at 160° C. and then for 2 hours at 180° C., gave an infusible product with a heat distortion point of 171° C., compared with 115° C. for the resin which had not been treated with divinylbenzene.

When the resin was heated for 2 hours at 60° C. and then for 1.5 hours at 160° C. with 12% of triethylene tetramine the infusible product had a heat distortion point of 163° C.

Example 5

A mixture of 228 parts of 4.4'-dihydroxydiphenyl-propane, 88 parts of 55% divinylbenzene (the remainder being ethylvinylbenzene with smaller amounts of diethylbenzene) and 4 parts of concentrated hydrochloric acid was heated slowly to 120° C. and maintained there for 90 minutes. After neutralization of the acid present with sodium carbonate, the product was converted into a glycidyl ether by reaction with an excess of epichlorohydrin in the presence of sodium hydroxide. A semi-solid resin was obtained with an epoxy content of 3.6 equivalents per kg.

When 100 parts of this resin were cured for 2 hours at 180° C. with 50 parts of phthalic anhydride, a hard, infusible resin was obtained with a heat distortion temperature of 137° C.

When this example was repeated, but without using any divinylbenzene, a liquid glycidyl ether was obtained, having an epoxy content of 5.0 equivalents per kg. 100 parts of this product heated for 2 hours at 180° C., with 45 parts of phthalic anhydride gave an infusible product with a heat distortion point of only 105° C.

Example 6

216 parts of ortho-cresol, 176 parts of 57% divinylbenzene and 3 parts of 70% sulfuric acid were mixed together and heated, with stirring to 70° C. At this point an exotherm occurred, taking the temperature of the mixture above 150° C. It was then allowed to cool to 100° C. and maintained there for 45 minutes, before the acid was neutralized with sodium carbonate. The product, which was a brown viscous liquid at room temperature, was converted to a glycidyl ether by reaction with an excess of epichlorhydrin. The product was a viscous liquid with an epoxy content of 3.24 equivalents per kg.

When 100 parts of this resin were cured with 45 parts of phthalic anhydride for 2 hours at 160° C. and then for 2 hours at 180° C. a hard infusible product was obtained with a heat distortion temperature of 77° C.

When no divinylbenzene was employed in this preparation the liquid epoxy product gave only thermoplastic materials when cured with phthalic anhydride.

What I claim is:

1. A glycidyl ether of a polyhydric phenol produced by heat condensation in the presence of a mineral acid catalyst of (A) a phenol containing at least one free phenolic hydroxyl group and at least one unsubstituted reactive position in a benzene nucleus and being free from other substituents capable of reacting with epoxide groups with (B) a monocyclic aromatic hydrocarbon containing as the sole non-aromatic unsaturation at least one vinyl group attached to the benzene ring of the aromatic hydrocarbon, reactants (A) and (B) being so selected that if (A) is a monohydric phenol (B) is a divinyl benzene, while if (B) is a monovinyl benzene, then (A) is a polyhydric phenol.

2. A glycidyl ether of a polyhydric phenol produced by heat condensation in the presence of a mineral acid catalyst of (A) a monohydric phenol containing at least one unsubstituted reactive position in a benzene nucleus and being free from other substituents capable of reacting with epoxide groups with (B) a divinyl benzene.

3. A glycidyl ether of a polyhydric phenol produced by heat condensation in the presence of a mineral acid catalyst of (A) a polyhydric phenol containing at least one unsubstituted reactive position in a benzene nucleus and being free from other substituents capable of reacting with epoxide groups with (B) a divinyl benzene.

4. A glycidyl ether of a polyhydric phenol produced by heat condensation in the presence of a mineral acid catalyst of (A) a polyhydric phenol containing at least one unsubstituted reactive position in a benzene nucleus and being free from other substituents capable of reacting with epoxide groups with (B) a vinyl benzene.

5. A glycidyl ether of a polyhydric phenol produced by heat condensation in the presence of a mineral acid catalyst of (A) a polyhydric phenol containing at least one unsubstituted reactive position in a benzene nucleus and being free from other substituents capable of reacting with epoxide groups with (B) styrene.

6. A glycidyl ether of a polyhydric phenol produced by heat condensation in the presence of a mineral acid catalyst of (A) a polyhydric phenol containing at least one unsubstituted reactive position in a benzene nucleus and being free from other substituents capable of reacting with epoxide groups with (B) divinyl benzene.

7. The hardened infusibilized glycidyl ether of claim 1.
8. The hardened infusibilized glycidyl ether of claim 2.
9. The hardened infusibilized glycidyl ether of claim 3.
10. A method which comprises reacting in the presence of an alkaline agent a chlorohydrin selected from the group consisting of an epichlorohydrin and glycerol dichlorohydrin with a glycidyl ether of a polyhydric phenol produced by heat condensation in the presence of a mineral acid catalyst of (A) a phenol containing at least one free phenolic hydroxyl group and at least one unsubstituted reactive position in a benzene nucleus and being free from other substituents capable of reacting with epoxide groups with (B) a monocyclic aromatic hydrocarbon containing as the sole non-aromatic unsaturation at least one vinyl group attached to the benzene ring of the aromatic hydrocarbon, reactants (A) and (B) being so selected that if (A) is a monohydric phenol (B) is a divinyl benzene, while if (B) is a monovinyl benzene, then (A) is a polyhydric phenol.
11. A composition of matter comprising (I) a glycidyl ether of a polyhydric phenol produced by heat condensation in the presence of a mineral acid catalyst of (A) a phenol containing at least one free phenolic hydroxyl group and at least one unsubstituted reactive position in a benzene nucleus and being free from other substituents capable of reacting with epoxide groups with (B) a monocyclic aromatic hydrocarbon containing as the sole non-aromatic unsaturation at least one vinyl group attached to the benzene ring of the aromatic hydrocarbon, reactants (A) and (B) being so selected that if (A) is a monohydric phenol (B) is a divinyl benzene, while if (B) is a monovinyl benzene, then (A) is a polyhydric phenol, and (II) an epoxy resin hardener for (I) selected from the group consisting of an organic acid anhydride and aliphatic polyamines.

References Cited in the file of this patent
UNITED STATES PATENTS

| | | |
|---|---|---|
| 2,247,402 | Perkins et al. | July 1, 1941 |
| 2,247,404 | Perkins et al. | July 1, 1941 |
| 2,444,333 | Caston | June 29, 1948 |
| 2,467,171 | Werner et al. | Apr. 12, 1949 |
| 2,653,142 | Cody | Sept. 22, 1953 |
| 2,665,266 | Wasserman | Jan. 5, 1954 |